UNITED STATES PATENT OFFICE.

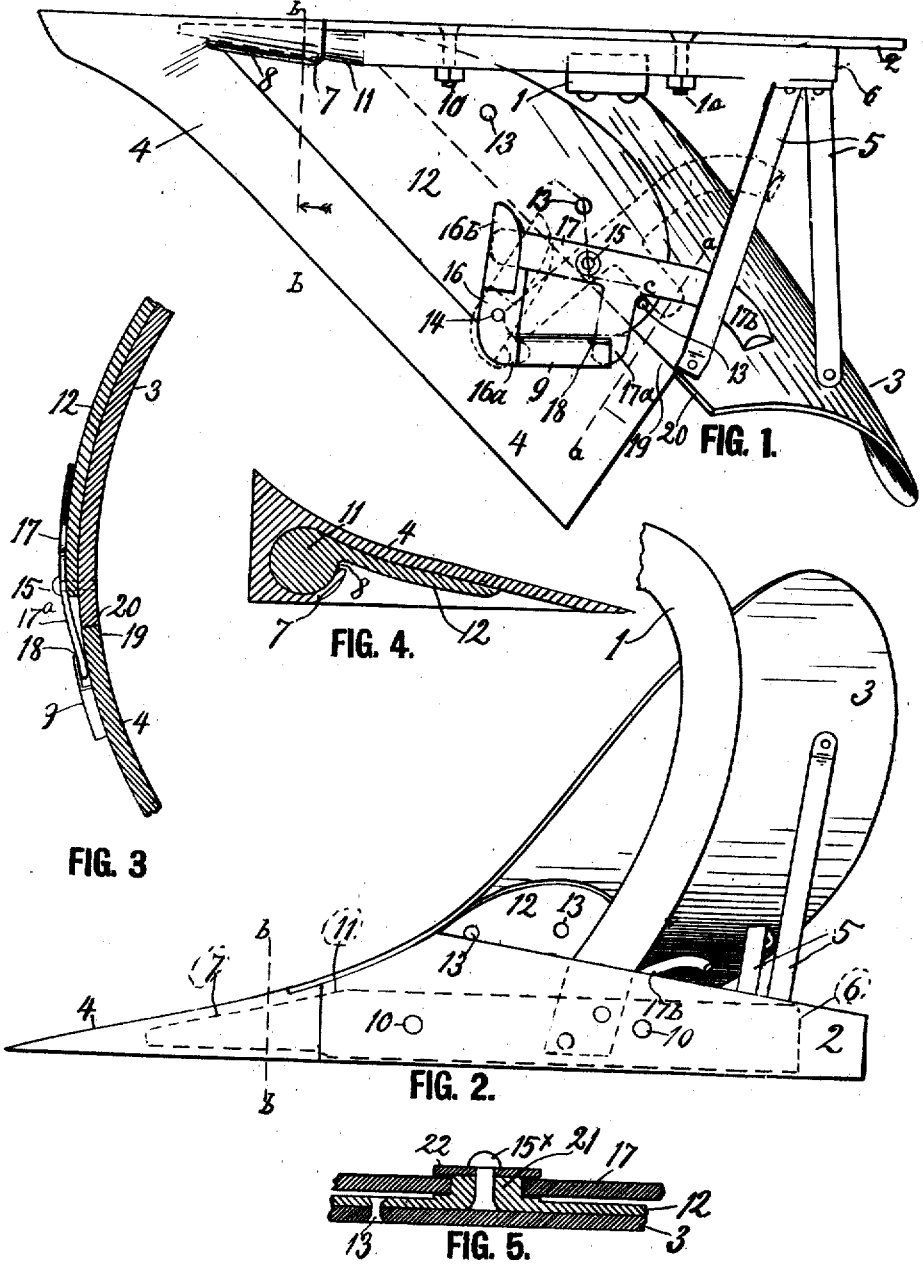

ANDREW B. MILLER AND EDWARD J. CHALUPA, OF BALDWIN, WISCONSIN, ASSIGNORS OF ONE-FOURTH TO MADS NELSON, OF BALDWIN, WISCONSIN.

QUICKLY-DETACHABLE PLOWSHARE

1,202,873.   Specification of Letters Patent.   Patented Oct. 31, 1916.

Application filed March 27, 1916. Serial No. 86,859.

*To all whom it may concern:*

Be it known that we, ANDREW B. MILLER and EDWARD J. CHALUPA, citizens of the United States, residing at Baldwin, in the county of St. Croix and State of Wisconsin, have invented a new and useful Quickly-Detachable Plowshare, of which the following is a specification.

Our invention relates to plows, and the object is to provide a plow with an easily and quickly detachable but firmly held share, so that whenever the share needs sharpening or repair or is to be exchanged for a larger or otherwise different share, it may be removed and another share replaced without the use of tools.

In the accompanying drawing,—Figure 1 is a bottom view of a plow embodying our invention. Fig. 2 is a side elevation of the plow and improvements shown in Fig. 1. Fig. 3 is an enlarged section on the line $a$—$a$ in Fig. 1. Fig. 4 is an enlarged section on the line $b$—$b$ in Figs. 1 and 2. Fig. 5 is an enlarged section on the line $c$—$c$ in Fig. 1.

Referring to the drawing by reference numerals, 1 designates the beam, 2 the landside, 3 the mold board and 4 the share of a plow in general. Usually braces like 5 extend from the mold board to the landside or to some reinforcing strip similar to the bar 6 in the drawing and the share is welded or otherwise secured either to the land-side or to the bar 6, so it can not be detached therefrom without considerable trouble and loss of time. To overcome said difficulty we make the share easily detachable in the following manner: The forward end of the share 4 is formed at its underside with a taper socket 7 having a longitudinal slit 8, and upon the underside of the rear portion of the share is provided a socket 9. And to the landside is secured by bolts 10 a flat bar 6, having its forward end 11 made taper so as to fit into the socket 7. To said end portion 11 of the bar is permanently secured by welding or like means a vertically curved frog plate 12, which when the horn 11 is in the socket 7 projects edgewise out of the slit 8 of same. Upon said plate 12 is secured either by bolts or rivets, 13, the adjacent portion of the mold-board 3.

Pivotally mounted on the plate 12, at 14 and 15 respectively, are two catches or levers 16 and 17. The lever 16 has at one end a hook $16^a$ normally engaging in the forward end of the socket 9 and at the other end it has a keeper or guard $16^b$ into which the adjacent end of lever 17 swings and locks lever 16 when the latter is in the socket 9. Lever 17 also has an arm $17^a$ engaging in the rear end of the socket 9, swinging also into a notch 18 in the socket (see Figs. 1 and 3). The rearward end $17^b$ of the lever 17 serves as a handle by which the lever is partly sprung and forced into said locking engagement with the lever 16 and the socket, where it is thus held by ample friction to prevent unwarranted unlocking until the lever is forced to the position shown in dotted lines in Fig. 1, when the share is to be removed.

From the foregoing description it will be understood that the locking levers 16, 17, when locked hold very firmly the share with its socket 7 upon the horn 11, because the lever end $16^a$ stands forced rearwardly against the socket 9 of the share, and as the lever arms $16^a$ and $17^a$ extend over the edge of the plate 12 and are sprung into the socket 9 they force the plate and the share firmly together with their adjacent surfaces, and the hook $16^a$ being rounded near its point acts as a cam in one side of the socket 9 of the share to force the share with its edge 19 against the edge 20 of the mold board.

In Fig. 5 is shown how the pivot 15 may be relieved of much of the force applied to the lever 17, by mounting said lever on an embossment or stud 21 on the plate 17 and retaining the lever upon said stud as a fulcrum by a washer 22 and a rivet $15^x$. It is obvious that the lever 16 may be similarly mounted.

What we claim is:—

1. In a plow, the combination with a landside member having a forwardly projecting shank and a vertically curved plate and a mold-board secured to the plate, of a plow share having underneath its forward end a taper socket adapted to fit upon the shank and having a longitudinal notch or slit for the forward edge of the plate, and means at the underside of the rear ends of the share and of the adjacent portion of the plate for locking them together in a readily detachable manner, said locking means comprising a catch on one of the said adjacent parts, and a cam hook pivoted on the other part and adapted to be forced into holding engagement with the catch and means for locking the cam-hook in said position.

2. In a plow, the combination with a land-side member having a forwardly projecting shank and a vertically curved plate and a mold-board secured to the plate, of a plow share having underneath its forward end a taper socket adapted to fit upon the shank and having a longitudinal notch or slit for the forward edge of the plate, and means at the underside of the rear ends of the share and of the adjacent portion of the plate for locking them together in a readily detachable manner, said locking means comprising a catch fixed on one of the said adjacent parts, a cam-shaped hook pivoted on the other part and arranged to engage the catch, and a lever pivoted on the same part as the hook and arranged to force and to hold the hook in engagement with the catch.

3. In a plow, the combination with a land-side member having a forwardly projecting shank and a vertically curved plate and a mold-board secured to the plate, of a plow share having underneath its forward end a taper socket adapted to fit upon the shank and having a longitudinal notch or slit for the forward edge of the plate, and means at the underside of the rear ends of the share and of the adjacent portion of the plate for locking them together in a readily detachable manner, said locking means comprising a catch fixed on one of the said adjacent parts, a cam shaped hook pivoted on the other part and arranged to engage the catch, and a lever pivoted on the same part as the hook and arranged to force and to hold the hook in engagement with the catch, said lever having an arm arranged to engage when in locked position a portion of the catch in such a manner as to thereby clamp together the overlapping edges of the said parts.

4. In a plow, the combination with a landside member having a forwardly projecting shank and a vertically curved plate and a mold-board secured to the plate, of a plow share having underneath its forward end a taper socket adapted to fit upon the shank and having a longitudinal notch or slit for the forward edge of the plate, and means at the underside of the rear ends of the share and of the adjacent portion of the plate for locking them together in a readily detachable manner, said locking means comprising a socket and a catch fixed on the share, a hook-lever pivoted on the plate and adapted to engage with its hook into the socket, and a friction held lever fulcrumed on the plate, and arranged to force and hold the hook-lever in locked position and to be engaged by the catch on the share.

5. In a plow, the combination with a land-side member having a forwardly projecting shank and a vertically curved plate and a mold-board secured to the plate, of a plow share having underneath its forward end a taper socket adapted to fit upon the shank and having a longitudinal notch or slit for the forward edge of the plate, and means at the underside of the rear ends of the share and of the adjacent portion of the plate for locking them together in a readily detachable manner, said locking means comprising a socket and a catch fixed on the plate and share, a hook-lever pivoted on the plate and adapted to engage with its hook into the socket, and a friction-held lever fulcrumed on the plate and arranged to force and hold the hook-lever in locked position and to be engaged by the catch on the share, the pivot joint of one of said levers comprising a heavy stud fixed on the plate for the lever to swing on, a washer retaining the lever upon the stud and a rivet or like means in the middle of the stud for securing the washer upon the end of it.

In testimony whereof we affix our signatures.

ANDREW B. MILLER.
EDWARD J. CHALUPA.